No. 637,870. Patented Nov. 28, 1899.
W. W. HOLLIDAY.
PLUG TOBACCO CUTTER.
(Application filed May 4, 1899.)
(No Model.)
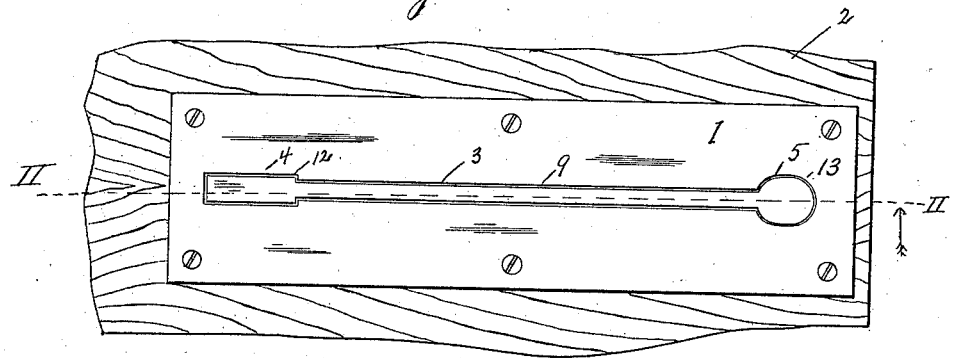
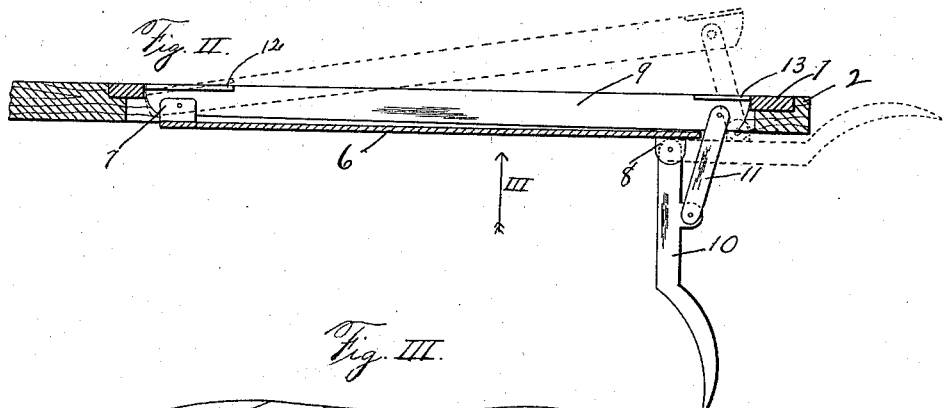
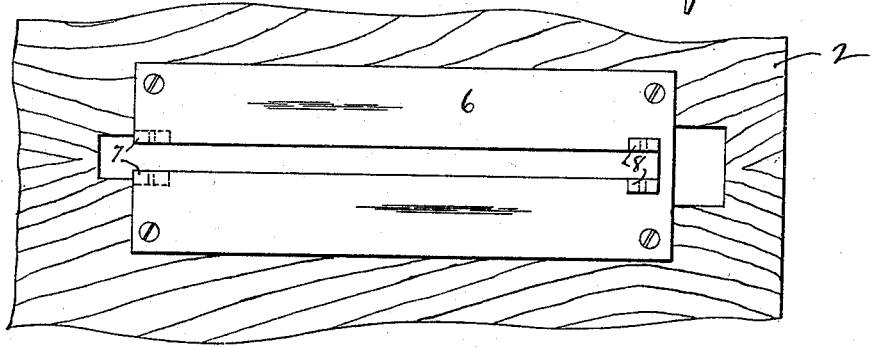
WITNESSES:
INVENTOR:
Willard W. Holliday,
BY
ATTORNEY.

United States Patent Office.

WILLARD W. HOLLIDAY, OF MORGAN COUNTY, ILLINOIS.

PLUG-TOBACCO CUTTER.

SPECIFICATION forming part of Letters Patent No. 637,870, dated November 28, 1899.

Application filed May 4, 1899. Serial No. 715,523. (No model.)

*To all whom it may concern:*

Be it known that I, WILLARD W. HOLLIDAY, a citizen of the United States, residing in the county of Morgan, State of Illinois, have invented an Improvement in Plug-Tobacco Cutters, of which the following is a specification.

My object is to construct a tobacco-cutter that may be embedded into the counter in such a manner that when its use is not required it is out of the way and at the same time it is in a position readily accessible.

My invention consists of a plate embedded into the upper side of the top board of a counter and having a slot, a second plate embedded into the lower side of the counter-board in alinement with the first plate, ears projecting upwardly from the rear end of the second plate, ears projecting downwardly from the forward end of the second plate, a knife pivotally connected to the first-mentioned ears, a handle pivotally connected to the second-mentioned ears, and a link connecting the forward end of the knife to the handle.

Figure I is a plan view of the counter, showing my tobacco-cutter in position for use embedded into the counter. Fig. II is a section taken on the line II II of Fig. I. Fig. III is a bottom plan view of the counter and the bottom plate, the other parts being omitted.

Referring to the drawings in detail, the plate 1 is embedded into the counter-board 2 and has a slot consisting of the central portion 3, the end portion 4, and the end portion 5. The plate 6 is embedded into the bottom of the counter-board in alinement with the plate 1, and the ears 7 extend upwardly from the rear end of the plate 6 and the ears 8 extend downwardly from the forward end of said plate. The knife 9 is pivotally connected to the ears 7 and operates through the slot in the plate 1. The handle 10 is pivotally connected to the ears 8, and the link 11 connects the handle 10 with the forward end of the blade 9. Flanges 12 extend laterally from the upper edge of the rear end of the knife 9 and fill the end portion 4 of the slot in the plate 1, and similar flanges 13 at the forward end of the knife fill the portion 5 of the slot.

When the free end of the handle 10 is elevated, as shown in dotted lines in Fig. II, the tobacco is placed on the plate 1 under the forward end of the knife, and when the handle is depressed the knife passes through the tobacco. When the use of the cutter is not desired, the handle 10 swings downwardly, the knife assumes its normal position in the slot in the plate 1, and the cutter is entirely out of the way.

I claim—

1. A tobacco-cutter consisting of a plate adapted to be embedded into the upper face of the counter and having a slot; a second plate adapted to be embedded into the lower face of the counter in alinement with the first plate; ears projecting upwardly from the rear end of the second plate; ears projecting downwardly from the forward end of the second plate; the knife pivotally connected to the first-mentioned ears; a handle pivotally connected to the second-mentioned ears; and a link connecting the forward end of the knife to the handle, substantially as specified.

2. A tobacco-cutter consisting of a knife embedded into the counter and adapted to swing upwardly; a handle pivotally connected below the counter and a link extending upwardly through the counter and connecting the handle to the free end of the knife, substantially as specified.

W. W. HOLLIDAY.

Witnesses:
J. H. EILERS,
J. F. ECKHOFF.